L. K. JENNE.
Corn-Planter.
No. 31,427.
Patented Feb 12. 1861.
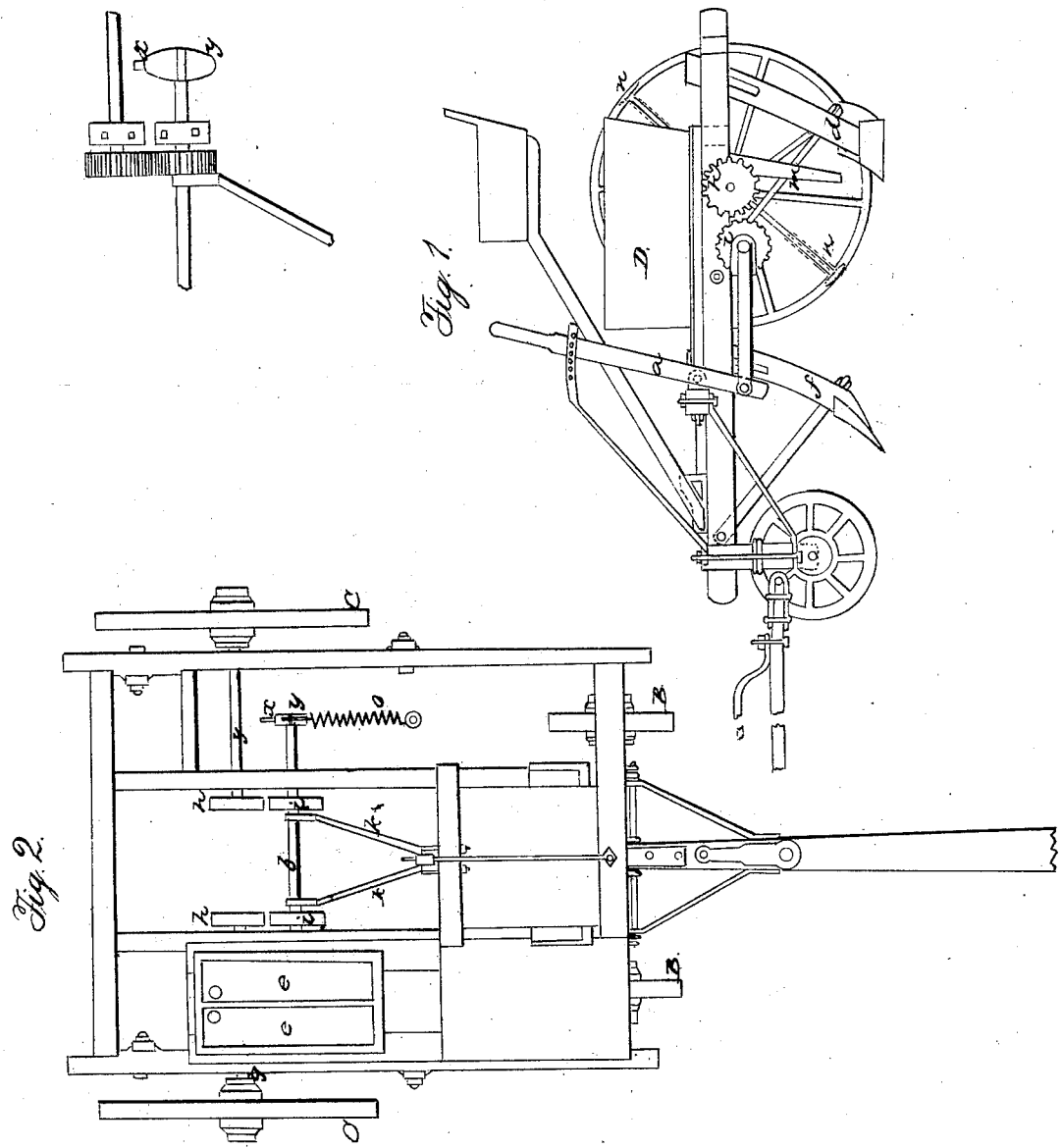
Witnesses.
J. K. Alexander
W. A. Hughes
Inventor.
Lansing R Jenne

UNITED STATES PATENT OFFICE.

LANSING K. JENNE, OF GRAND RAPIDS, MICHIGAN, ASSIGNOR TO HIMSELF AND WM. ASHLEY, OF SAME PLACE.

IMPROVEMENT IN CORN-PLANTERS.

Specification forming part of Letters Patent No. 31,427, dated February 12, 1861.

*To all whom it may concern:*

Be it known that I, LANSING K. JENNE, of Grand Rapids, in the State of Michigan, have invented certain new and useful Improvements in Corn-Planters; and I do hereby declare that the following is a full, clear, and exact description of the same, reference being had to the accompanying drawings, and to the letters of reference marked thereon, in which—

Figure 1 is a side elevation, and Fig. 2 a plan view with one of the seed-boxes removed for the purpose of showing the manner in which the slide is operated, and Fig. 3 a section of the sliding shaft with the cam attached.

The nature of my invention consists in the peculiar combination and arrangement of such devices, as will be hereinafter fully set forth.

To enable those skilled in the art to make and use my machine, I will now describe its construction and operation.

A represents the frame; B B, the fore wheels, and C C the hind or driving wheels.

$g$ $g$ are two shafts, upon which the hind wheels are secured. At the opposite end of said shafts are the cog-wheels $h$ $h$.

$b$ also represents a shaft, upon which are secured the cog-wheels $i$ $i$. Said wheels should correspond in size with those just mentioned. The shaft $b$ is so arranged that by means of the lever $a$ and the connecting-rods $k$ $k$, which connect it to said lever, it may slide forward, and thus at any moment the machine may be conveniently thrown out of gear, as fully represented in Fig. 1. The shaft $b$ is provided at each end with cams $y$ $y$ for the purpose of operating the slides as the shaft revolves.

D D represent two seed-boxes. Each of said boxes should be partitioned through its center, as seen in Fig. 2, thus forming a chamber for the fertilizing material.

$e$ represents the slide, which extends across the bottom of the box, thus serving both for the grain and fertilizing material. The bottom of the slides are provided with a projection, $x$, to which is attached the spiral spring $o$, as shown in Fig. 2, for the purpose of forcing the slides back in their proper place when operated upon by the cross-pieces on shaft $b$.

$m$ $m$ are two discharge-spouts. The mouth of each spout should be sufficiently wide to take in both the grain and fertilizing material from their respective boxes. Thus will both be discharged at the same time and in the same place.

$ff$ are double-mold plows located in front of each discharge-spout for the purpose of making a furrow for the reception of the grain.

$d$ $d$ are side-turn plows to follow immediately after and cover both grain and material up when discharged.

$n$ $n$ are check-pins for the purpose of regulating the distance of the rows of corn.

The operation of this machine is simple. As the driving-wheels $c$ $c$ revolve, motion is communicated to the shaft $b$ by means of the cog-wheels $h$ $h$ and $i$ $i$. The slides are thus operated by the cross-pieces on shaft $b$, and the grain discharged.

Having thus fully described my invention, what I claim, and desire to secure by Letters Patent, is—

The arrangement of adjustable plows $d$ $d$ and $ff$, seed and fertilizing slides $e$ $e$, sliding shaft $b$, by which the machine is thrown in and out of gear, lever $a$, double boxes D D, and check-pins $n$ $n$, when the whole shall be combined and operated substantially as and for the purpose specified.

LANSING K. JENNE.

Witnesses:
J. C. WENHAM,
J. T. MILLER.